Jan. 31, 1961
A. SOBOTKA
2,970,001
EASY RELEASE BALE HOOK
Filed March 30, 1959
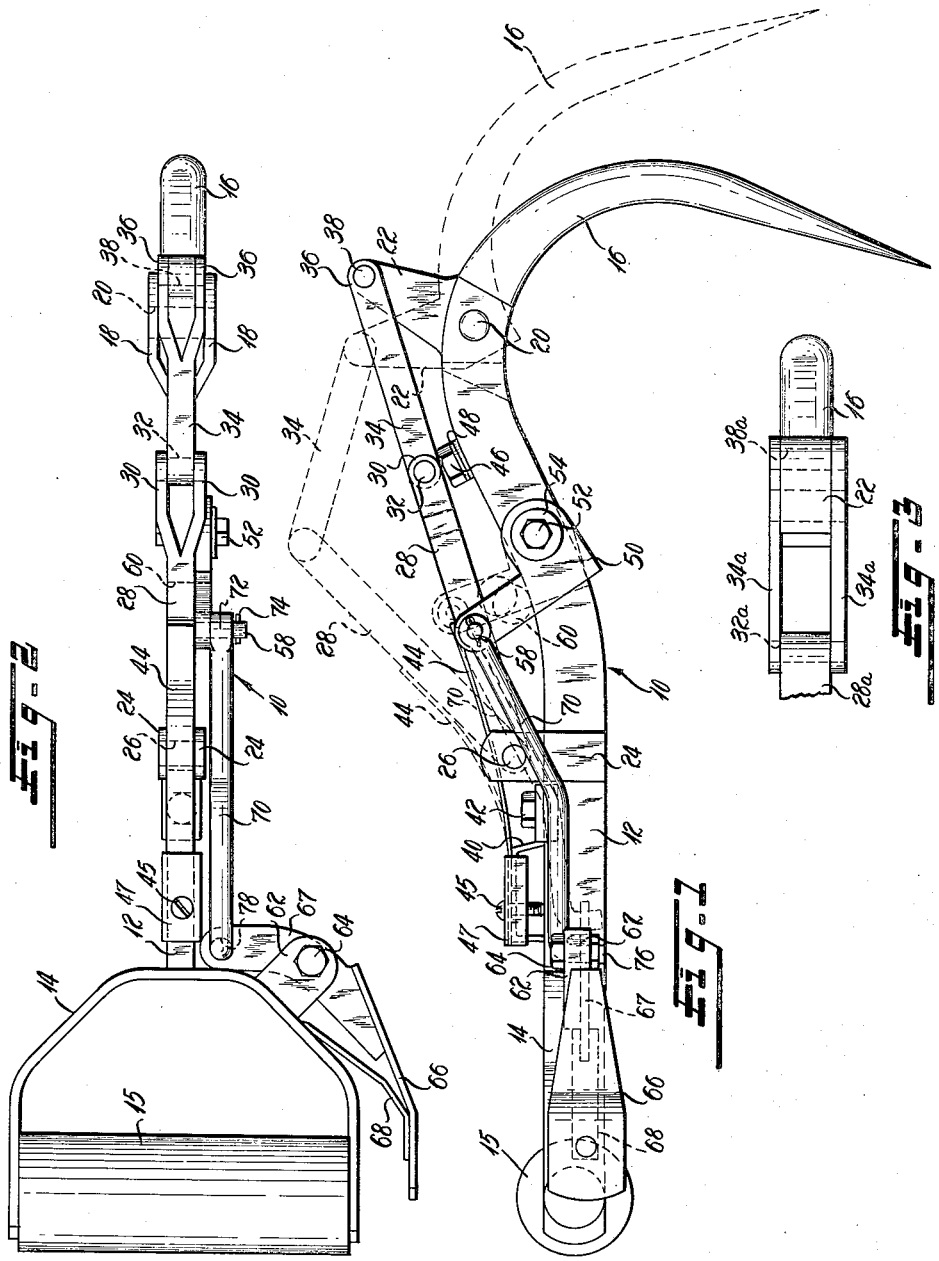
INVENTOR
AUGUST SOBOTKA
Henry Shur
ATTORNEY

United States Patent Office 2,970,001
Patented Jan. 31, 1961

2,970,001

EASY RELEASE BALE HOOK

August Sobotka, Intake, Mont.

Filed Mar. 30, 1959, Ser. No. 802,935

14 Claims. (Cl. 294—26)

The present invention relates to a device for handling bales of hay and other commodities, and more especially to a new improved easy release, self-cocking bale hook incorporating a pivoted bill and means for locking and releasing it, thereby facilitating disengagement of the hook from the bale.

The bale hook in general use for handling of hay and like commodities is the familiar sickle-shaped integral metal hook with a handle. This hook has a number of shortcomings, however. For example, a bale of hay, which is usually carried with two hooks, must be placed on a supporting surface so that the hooks can be worked out of the bale. Also, when stacking bales at a height which requires the arms to be fully outstretched, it is awkward and sometimes difficult to work the hooks loose from the bale.

Various trip release bale hooks have been developed in attempts to meet these and related problems, over a period of at least fifty years (for example, see U.S. Letters Patent Nos. 920,700; 986,644; 1,180,196; 2,631,882; and 2,138,694). However, a satisfactory, practical, easy release and self-cocking baling hook has not been heretofore developed, and there is none available on the market, to applicant's knowledge or belief.

It is accordingly a primary object of the present invention to provide a novel improved bale hook including a pivoted bill or tine, with a manually actuated means for releasing the bill so it can swing with respect to the hook frame and assume a position to disengage itself from a bale and allow the bale to drop, without requiring that the bale be rested on a supporting surface before the hook can be disengaged therefrom, and without having to work the bill of the hook out of a stacked bale.

It is another principal object of the present invention to provide such a bale hook with pivoted bill having a latch on the handle disposed so that it can readily be operated with the thumb, while all fingers engage the handle of the hook to carry the weight of the bale, whereby the operator can readily release the hook even though carrying a heavy bale with two hands, and can even use the hook with mittens in cold weather.

It is still a further principal object of the present invention to provide such a novel bale handling hook incorporating a novel overcenter positive lock for the pivoted bill, with the locking effect increased by the force exerted on the pivoted bill by the bale, but which is easily releasable with a small pressure and small movement of the thumb, through incorporation of an unlocking member which moves the overcenter linkage through center, so that the weight of the bale on the bill causes the bill to swing around its pivot for easy disengagement. It is another related object of the invention to provide a simplified automatic recocking means for the pivoted bill. It is still another object to provide such an easy release bale hook in which a positive unlocking action is necessary to pivot the bill on the hook frame, thereby preventing accidental release which would be dangerous in handling hay bales that usually weigh about eighty pounds.

It is a still further object of the present invention to provide a novel improved easy release bale hook having a sickle shape in locked position, with all working parts clear of the working side of the hook, so that no operating parts engage or interfere with the bale during use.

It is also an object of the present invention to provide a novel improved self release bale hook that has the advantages above discussed and minimizes fatigue, saves time, and reduces labor costs so that the cost of my easy release, self-cocking bale hook is recouped in a short time.

It is still another object of the present invention to provide a novel improved easy release bale hook which achieves the above discussed advantages and objects, yet is of simplified design so it can be produced economically and marketed in competition with the aforementioned integral sickle-shaped hook now in general use.

Still other objects and advantages of the present invention will be apparent from the following description and appended claims, with reference to the accompanied drawings wherein:

Fig. 1 is a side elevation view of a preferred embodiment of the easy release bale hook of this invention (for the left hand), with the parts shown in solid line in their position when the bill is locked for carrying bales, and in dotted line in their position when the bill is pivoted for release of the bale;

Fig. 2 is a top plan view of the easy release bale hook of this invention shown in Fig. 1, with the bill shown in locked position only; and Fig. 3 is a fragmentary top plan view showing a modification of the overcenter linkage used in the embodiments of Figs. 1 and 2.

Referring now to the drawing, the novel improved easy release, self-cocking bale hook of the present invention is generally indicated by the numeral 10, and includes a central frame portion 12, with a stirrup handle 14 at one end, and a pivoted bill 16 at the other end.

The stirrup handle 14 comprises a generally U-shaped metal member which is secured to the end of the frame 12 by welding or like suitable means, and a grip 15 of wood or the like mounted on a rod passing through the ends of the U-shaped handle portion 14. The bill 16 is curved as shown in the drawings and brought to a point at its outer end to facilitate embedding it in a bale of hay or the like. The bill end of the frame 12 is formed in the shape of a clevis, thus providing two spaced lugs 18 between which the bill 16 is pivoted on a rivet or the like 20. The bill 16 is also provided adjacent its pivoted section with an arm 22 projecting from the frame 12 in a direction substantially opposite bill 16. A pair of like lugs 24 are secured to opposite sides of the frame 12, by spot welding or like means, and support a pin 26, on which is pivotally mounted one end of the first link 28 of the overcenter lock. This overcenter link 28 is formed at its outer end with a clevis providing a pair of spaced lugs 30 between which one end of a second overcenter locking link 34 is pivoted on pin 32. Link 34 is in turn provided at its other end with a clevis forming spaced lugs 36, between which the outer end of arm 22 on hook bill 16 is pivotally secured by means of pin 38.

A spring supporting bracket 40, having a configuration as shown in the drawings, is mounted on the top of frame 12 by a cap screw 42 extending through the web of a small channel-shaped section which overlaps the frame top and sides. An elongated leaf spring 44 is mounted on the raised portion of bracket 40 by a screw or rivet 45 extending through corresponding apertures in spring 44, the raised portion of bracket 40, and a channel shaped clamp member 47. As will be apparent from the drawings, the leaf spring 44 extends over the top of link 28 to about its mid-point, and presses against this link urging it toward the frame 12, so that the pivot 32 of the overcenter connection is normally biased against an adjustable stop screw 46 threaded into frame 12 and preferably having one or more lock washers 48 to lock it against rotation. A generally L-shaped lever 50 is pivotally mounted at one end on the side of frame 12 by a cap screw or rivet 52. A pin 58 is non-rotatably mounted on the other end of the L-shaped pivot member 50, and member 50 has a camming or operating projection 60 disposed between the upper surface of frame 12 and the underside of link 28 for engagement with the latter, as hereinafter amplified.

The U-shaped part 14 of the handle is provided with an outwardly extending lug 62. A thumb latch 66 including "horizontal" section 67 is pivotally mounted on lug 62 by means of bolt or rivet 64, and the latch 66 is biased away from the handle 14—15 by a leaf spring 68, which is secured to the rear end of the thumb latch and presses against the outer surface of the U-shaped handle member 14. The thumb latch 66 is interconnected with the pivoted member 50 by a rod 70 which has a configuration as shown in Figs. 1 and 2 of the drawings, with a looped head 72 that is pivotally mounted on the pin 58 and secured by a cotterpin 74 or like means. The other end of interconnecting rod 70 is bent to form a projection 76 which is pivotally received in an aperture 78 in the end of the thumb latch 66 and is secured therein by any suitable means such as a cotterpin passing through a hole drilled in the end of rod projection 76.

*Operation.*—Normally the spring 68 biases the thumb latch 66 outwardly so that rod 70 is in the retracted position shown in Fig. 2, and in solid line in Fig. 1, whereby pivoted L-shaped member 50 is in the solid line position of Fig. 1 with the cam projection 60 adjacent or on the top surface of frame 12. With rod 70, member 50, and cam portion 60 in this position, the leaf spring 44 pressing down on link 28 causes links 28 and 34 to assume the position shown in full line in Fig. 1. In this position, the axis of pivot pin 32 is at a point between the frame 12 and the line extending through the centers of pivots 26 and 38 (determined by appropriate adjustment of cap screw 46) so that pivoted bill 16 is locked in the solid line position shown in Fig. 1 by overcenter linkage 28—34. Exertion of a load on bill 16 tends to displace the pivot point 32 against the screw 46 so that bill 16 is even more securely locked in working position by the overcenter linkage, and accidental unlocking is impossible with proper adjustment of cap screw 46. In use, the improved bale hook 10 of this invention is wielded in the ordinary way to embed bill 16 in a bale. When it is desired to disengage the hook from the bale, the user merely depresses the thumb latch 66 towards the handle portion 14 as he continues to hold the handle grip 15 with his four fingers. When the latch 66 is thus depressed, "horizontal" latch portion 67 is pivoted around screw 64, displacing rod 70 to the right in Figs. 1 and 2, thereby rocking the L-shaped member 50 about pivot 52 to the dotted line position shown in Fig. 1. The rocking of member 50 causes the cam-like projection 60 to engage the underside of link 28 and pivot it counterclockwise around pin 26 a slight but sufficient distance to displace the axis of pivot pin 32 to the other side of the center line through the axes of pivot pins 26 and 38. When the pivot pin 32 is thus moved through overcenter position, the weight of the bale or other force exerted on bill 16 causes it and lever 22 to pivot counterclockwise in Figure 1 so that parts 16, 22, 34, 28 and 44 are in the dotted line position shown in Figure 1. As a result, the hook bill 16 is readily extricated from the bale, much more quickly and with less effort than the common form of integral hand hook mentioned above. It will be understood that the novel improved hook 10 of my invention is self-cocking, and that as soon as bill 16 has been disengaged from the bale, leaf spring 44 restores link 28, and thus link 34, lever 22 and bill 16, to their initial position, whereby bill 16 is automatically locked securely by the overcenter linkage 24—34, as above discussed.

It will be noted that the novel overcenter locking device in the easy release bale hook 10 of this invention not only positively and securely locks the bill 16 so it cannot be accidently displaced, since the weight of the bale increases the locking effect, but that only a small operating movement of latch 66 is required to unlock the bill 16 and permit withdrawal from the bale, because of the cam actuated overcenter arrangement above described. Hence, the novel improved releasing bale hook of this invention can be operated while the user exerts full force on the handle 15, and can even be operated with mittens in cold weather, which is not possible with other trip bale hooks where the entire hand or one of the fingers is required to release the hook.

As previously noted, the easy release, self-cocking bale hook 10 shown in Figs. 1 and 2 of the drawing is for the left-hand, and latch 66 is operated with the left thumb. In carrying bales, both a left-hand and right-hand bale hook are generally utilized, since a typical bale weighs about 80 pounds. The right-hand hook is identical with the left-hand hook shown in Figs. 1 and 2, excepting that lug 62, thumb latch 66, spring 68, rod 70, and pivotal member 50 are disposed on the opposite side of frame member 12, in a like manner as for the left-hand hook. The easy release hook of the present invention can also be made both right and left-handed by mounting on each of the opposite sides of frame 12, a lug 62, thumb latch 66, spring 68, rod 70, and L-shaped member 50 pivotally mounted on screw 52 and also secured to the cam-like projection 60, etc., and using like interconnecting parts.

The specific construction of the disclosed preferred embodiment of the present invention can be modified while retaining the same principles and structural features. For example, referring to the modification illustrated in the fragmental top plan view of Fig. 3, the bale hook 10 can incorporate a link 28a which corresponds to the link 28 in the embodiment of Figs. 1 and 2, but does not have a clevis forming lugs (30) at its end. The clevis and the second link 34 are replaced by a pair of bars 34a, which are pivotally connected at one end to a pin 32a passing through the end of link 28a, and at the other end to arm 22 of the bill 16 by means of a pin 38a (in lieu of the clevis lugs 36 of link 34 in the preferred embodiment of Figs. 1 and 2).

Of course the proportions of the frame 12, handle 14—15, and bill 16 can be varied according to convenience without departing from the principle of this invention.

It will be apparent from the foregoing description that I have invented a novel improved easy release, self-cocking, bale hook incorporating a very effective overcenter locking means that is releasable by thumb actuated means, with all working parts disposed outside of the working area of the bale hook, which achieves the objectives and advantages and solves the shortcomings of prior devices of this type as above discussed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A bale hook comprising: a frame with a handle; a bill pivotally mounted on said frame and projecting therefrom, said bill being pivotable between a first load carrying position disposed towards said handle and a second position disposed away from said handle; overcenter linkage means connected between said frame and part of said bill for locking the bill in said first load carrying position, said overcenter linkage means being displaceable to permit the bill to be pivoted to said second position; said overcenter locking means being entirely disposed on a portion of the frame which is substantially opposite the part of the frame from which the bill projects.

2. A bale hook as defined in claim 1, further comprising: operating means on said frame for displacing said overcenter linkage means through overcenter position to unlock same, and thereby permit said bill to pivot to said second position, said means including an actuating member mounted adjacent said handle.

3. A bale hook as defined in claim 2, wherein said operating means includes a latch movably mounted on said handle, a member movably mounted on said frame adjacent to and engageable with said overcenter linkage means to displace it through overcenter position, and means on said frame interconnecting said latch and said member so that the latter is displaced upon movement of the latch.

4. A bale hook as defined in claim 3, wherein said handle includes a U portion connected to the frame and a hand grip, and said latch is pivotally mounted on the outside of said U portion so that it can be operated with the thumb, without removing any fingers from the handle grip.

5. A bale hook as defined in claim 2 further comprising: means for biasing said overcenter means to locking position, so that said bill is automatically returned to said first load carrying position when said operating means is not operated.

6. A bale hook comprising: a frame with a handle; a bill pivotally mounted on said frame and projecting therefrom, said bill being pivotable between a first load carrying position disposed towards the handle and a second position disposed away from the handle; a member on said bill projecting from the frame substantially opposite to the projection of said bill; overcenter means for locking said bill in said first load carrying position, and permitting said bill to pivot to said second position, said overcenter means being connected between said projecting member on the bill and part of the frame; means normally disposing said overcenter means in bill-locking position; and operating means for displacing said overcenter locking means through center to unlock same and permit the bill to pivot to said second position, including an operating member mounted adjacent said handle.

7. A bale hook as defined in claim 6, wherein said overcenter means comprises a first link pivotally connected at one end to said member on the bill, a second link pivotally mounted at one end on said frame, and a pivotal connection between the other end of each of said links; said last mentioned means comprising a spring on said frame exerting a force on one of said links biasing it toward said frame.

8. A bale hook as defined in claim 7, wherein each of said links of said overcenter means includes a clevis-type pivot connection.

9. A bale hook as defined in claim 7, wherein one of said links is a bar, and the other of said links comprises a pair of straps acting as a single link.

10. A bale hook as defined in claim 7, wherein said last means is a flat spring mounted on said frame adjacent one of its ends and extending over and pressing against said second link to bias it toward the frame.

11. A bale hook as defined in claim 7, wherein said operating means comprises a latch movably mounted on said handle, a member movably mounted on said frame adjacent to and engageable with one of said links to displace the pivotal connection therebetween through overcenter position, and means interconnecting said latch and said member to displace the latter upon movement of the latch.

12. A bale hook as defined in claim 11, wherein: said handle includes a U-member connected to said frame, with a hand grip; and said latch is pivotally mounted on the side of the U-member so that it can be operated with the thumb without removing any fingers from the hand grip.

13. A bale hook as defined in claim 12, wherein said thumb latch is pivotally mounted on the right of the U-member, providing a left-handed bale hook.

14. A bale hook comprising: a frame; a handle connected to one end of the frame; a bill pivotally mounted on the other end of the frame and projecting therefrom, said bill being pivotable between the first load carrying position disposed toward the handle and a second position disposed away from the handle; said frame and bill being substantially sickle-shaped when the bill is in said first position; a member on said bill projecting from the frame substantially opposite to the projection of said bill; overcenter bill-locking linkage means comprising a first link pivotally connected at one end to said member on the bill, a second link pivotally mounted at one end on said frame, and a pivotal connection between the other end of said links; a spring on said frame exerting a force biasing one of said links towards said frame; a member movably mounted on said frame adjacent to and engageable with one of said links to displace said pivotal connection therebetween through overcenter position; a thumb latch movably mounted on said handle; and means interconnecting said thumb latch and said last-mentioned movable member so that displacement of the latch moves said last-mentioned member and causes it to displace the overcenter locking means through overcenter position, against the biasing force of said spring, whereby said bill is unlocked and readily pivots to said second position.

References Cited in the file of this patent

UNITED STATES PATENTS

| 920,700 | Waterman | May 4, 1909 |
| 1,004,297 | Nygren | Sept. 26, 1911 |
| 1,180,196 | Schepp | Apr. 18, 1916 |
| 2,138,694 | Daugherty | Nov. 29, 1938 |
| 2,575,986 | Yoder | Nov. 20, 1951 |
| 2,772,111 | Eide | Nov. 27, 1956 |
| 2,851,298 | Schulz | Sept. 9, 1958 |